United States Patent [19]

Inao

[11] 4,398,331
[45] Aug. 16, 1983

[54] METHOD OF CONNECTING PIPE PIECES VIA UNIVERSAL JOINT

[75] Inventor: Fumiya Inao, Tamano, Japan

[73] Assignee: Agency of Industrial Science & Technology, Tokyo, Japan

[21] Appl. No.: 238,047

[22] Filed: Feb. 25, 1981

[30] Foreign Application Priority Data

Apr. 24, 1980 [JP] Japan .................................. 55-53517

[51] Int. Cl.³ .......................... B23P 15/00; F17D 1/08
[52] U.S. Cl. ..................................... 29/157 R; 29/434; 285/136; 285/137 R; 285/166; 285/168; 137/615
[58] Field of Search ............ 29/434, 157 R; 285/265, 285/264, 166, 168, 137 R, 136; 137/615, 580; 141/388

[56] References Cited

U.S. PATENT DOCUMENTS

| | | | |
|---|---|---|---|
| 323,834 | 8/1885 | Turner | 285/168 |
| 3,847,107 | 11/1974 | Buddrus | 285/137 R |
| 4,031,919 | 6/1977 | Ortloff et al. | 285/137 R |
| 4,165,108 | 8/1979 | de Saint-Palais | 137/615 |
| 4,299,260 | 11/1981 | Jansen | 137/615 |
| 4,311,327 | 1/1982 | Ortloff et al. | 285/168 |
| 4,337,970 | 7/1982 | Gunderson | 285/168 |

Primary Examiner—Daniel C. Crane
Attorney, Agent, or Firm—Armstrong, Nikaido, Marmelstein & Kubovcik

[57] ABSTRACT

The invention is concerned with an improvement in the method of connecting pipe pieces incorporated in a node-equipped riser pipe interconnecting a floating facility and a sea bottom facility. A rocker pipe is connected through a swivel joint to each main pipe piece fixed to corresponding riser pipe piece. A relay pipe is disposed in a universal joint through which the riser pipe pieces are coupled to each other. The rocker pipes are connected to respective ends of the relay pipe through substantially U-shaped connecting pipes provided at their both ends with ball joints.

1 Claim, 5 Drawing Figures

METHOD OF CONNECTING PIPE PIECES VIA UNIVERSAL JOINT

BACKGROUND OF THE INVENTION

The present invention relates to a method of connecting, through a universal joint, main pipes which are fixed to a member such as a riser pipe.

Hitherto, node-equipped riser pipes are used to connect a floating facility and a sea bottom facility for extracting crude oil buried under the sea bottom. In this riser pipe, adjacent riser pipe pieces are connected through a universal joint which permits these riser pipe pieces to be flexed in relation to each other.

On the other hand, the main pipe pieces fixed to the riser pipe pieces are connected through swivel joints to a relay pipe incorporated in the universal joint, such that an inclination of the upper and lower main pipe pieces in relation to each other is compensated for by the rotation of the swivel joint.

In addition, the main pipe piece itself is bent in the form of a loop to absorb the eccentricity or offset between the axis of a cross pin and the axis of the swivel joint which is increased as the wear of the bearing of the cross pin is increased.

In this conventional pipe connecting structure, however, it is necessary that the swivel joint be disposed such that the axis of the swivel joint coincides with the axis of the cross pin. Namely, there is a severe demand for the coincidence of axes between the swivel joint and the cross pin. Therefore, when the number of pipes is large, it is extremely difficult to connect the adjacent main pipe pieces through the universal joint and, in addition, the amount of radial projection of the expandable portion of the main pipe piece, extending in the radial direction of the riser pipe, becomes impractically large. At the same time, the path of the piping becomes extremely complicated.

Furthermore, this method which, for the compensation of the offset between axes of the cross pin and swivel joint, relies solely on expansion and contraction of the expandable portion of the main pipe piece, will not only increase the force to be imposed on the swivel joint but also shorten its life when the wear of the cross pin bearing becomes excessively large.

SUMMARY OF THE INVENTION

The present invention is directed to a method of connecting, at the portion of a universal joint, pipe pieces respectively fixed to two members, for example riser pipes, connected together through the universal joint.

More specifically, according to the invention there are incorporated a swivel joint and a ball joint intermediately in a piping comprising pipe pieces connected through a universal joint to thereby provide a link mechanism in the piping itself, whereby when the two members connected together through the universal joint undergo oscillatory motion, the relative angular displacement then caused to the pipe pieces connected to the respective members can be effectively compensated for through the function of the link mechanism.

In further greater detail, according to the invention, a rocker pipe is connected in a lever-like manner through a swivel joint to a main pipe fixed in the riser pipe, the rocker pipe having one end bent substantially in the form of U and connected through a ball joint to a relay pipe provided in a universal joint interconnecting adjacent riser pipe pieces, while the other end of the riser pipe being connected to the rocker pipe through a ball joint.

By employing such a method of connecting pipe pieces as briefly described above, there can be brought about various advantages over comparable method of the conventional art, for example as follows:

1. A moderation can be effected of the requirement for a high precision in the arrangement and installation of the piping.
2. Made feasible is to dispose pipe pieces in a parallel arrangement with the result that not only the number can be increased of the piping but also can be reduced the amount of radial projection of pipe pieces at the expandable portion thereof.
3. The swivel joint can no longer be acted upon by a force due to offsetting of pipe pieces, so that the life thereof can be prolonged.

DESCRIPTION OF THE PREFERRED EMBODIMENTS

Figure 1:
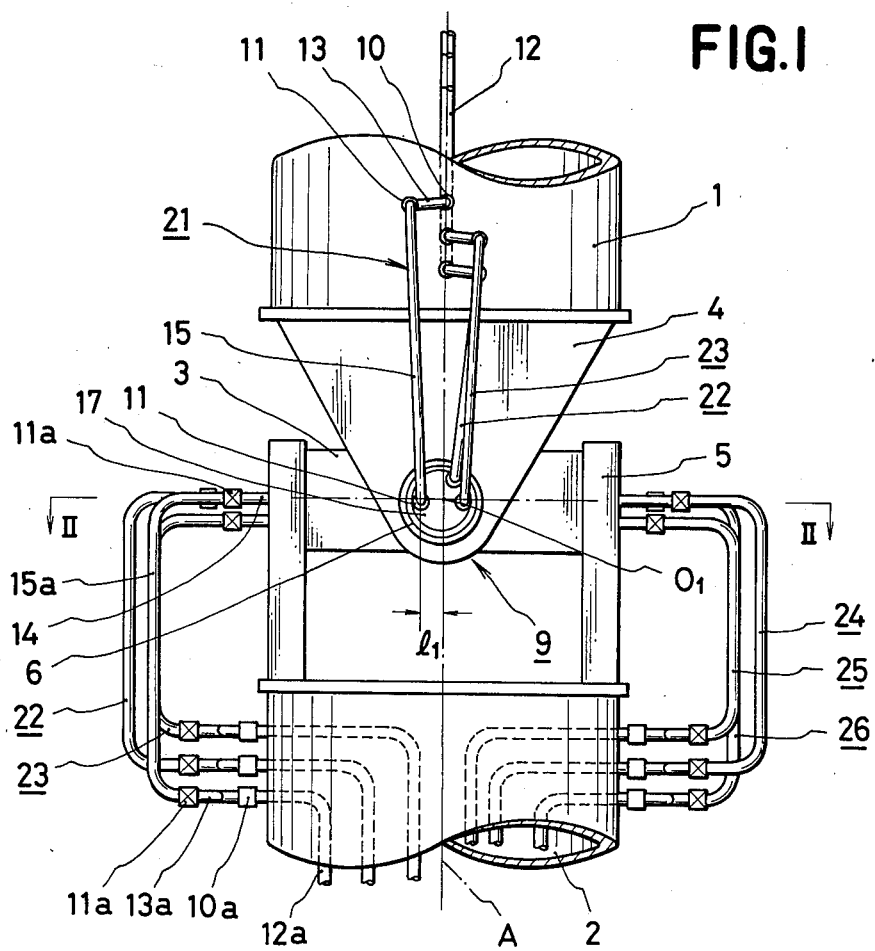
FIG. 1 is a side elevational view of pipe pieces connected in accordance with the method of the invention, showing particularly the portion including a universal joint and its vicinity.
Figure 2:
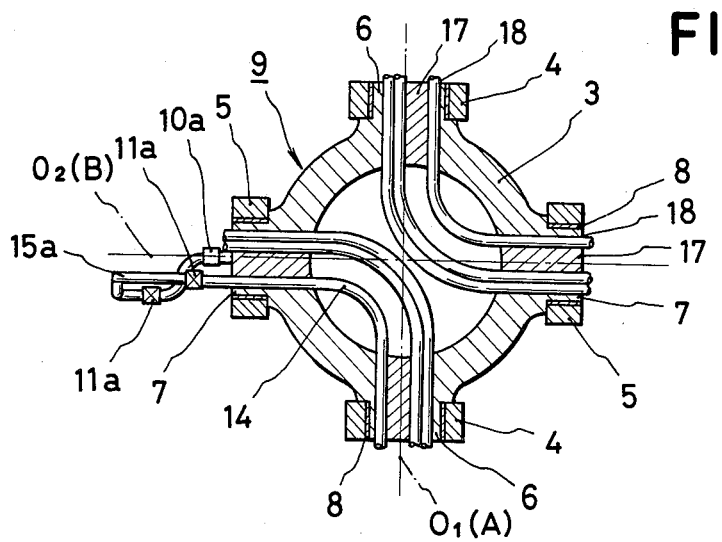
FIG. 2 is a sectional view taken along the line II—II of FIG. 1.
Figure 3:
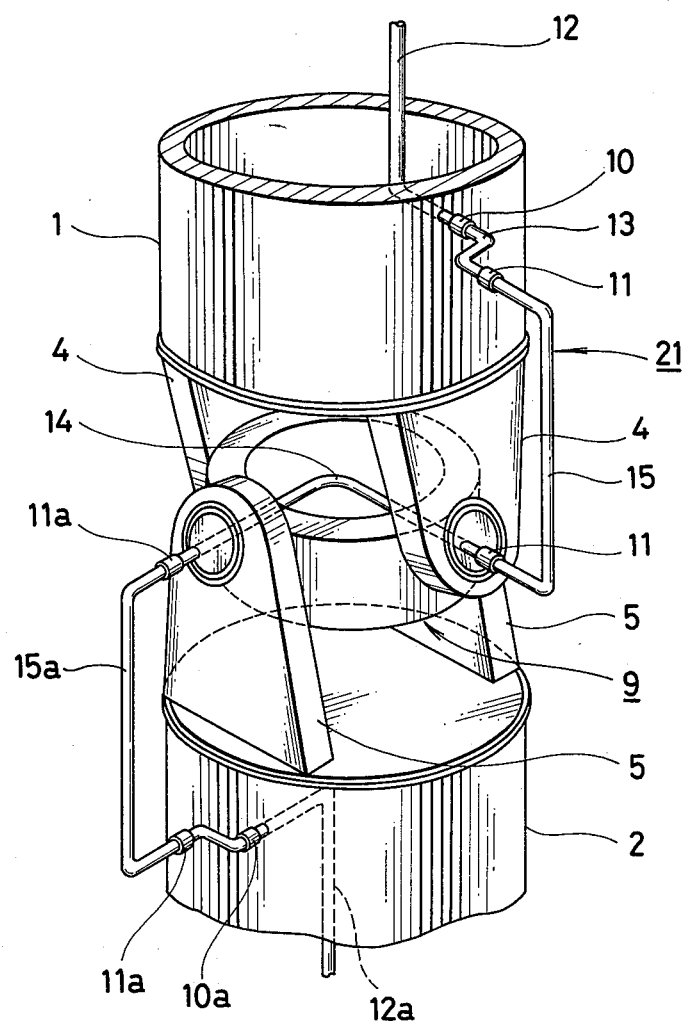
FIG. 3 is a perspective view of one of the pipes connected in accordance with the connecting method of the invention.

Referring to FIGS. 1 to 3, two adjacent members, i.e. an upper riser pipe piece 1 and a lower riser pipe piece 2 are connected to each other by means of a known universal joint, in such a manner as to be able to swing or rock relatively to each other.

The universal joint 9 includes a cross pin 3, upper yoke 4 and a lower yoke 5. The upper yoke 4 is fixed to the lower side of the upper riser pipe piece 1, while the lower yoke 5 is fixed to the upper side of the lower riser pipe piece 2. The cross pin 3 has hubs 6 and 7 projected therefrom in four directions and supported by the arms of the upper and lower yokes 4 and 5 through respective bearings 8.

At the same time, a main pipe 12 is extended in the longitudinal direction of the riser pipe piece 1, and is fixed to the latter in such a manner that its end projects radially outwardly from the riser pipe piece 1. Namely, as will be understood from FIG. 1, the end of the main pipe 1 is located in a plane A which contains the axis (not shown) of the upper riser pipe piece 1 and the axis $O_1$ of the hub 6 of the cross pin 3.

A substantially S-shaped rocker pipe 13 is connected to the end of the main pipe 12, through a swivel joint 10, in such a manner as to be able to rock in the circumferential direction of the upper riser pipe piece 1.

On the other hand, as shown in FIG. 2, L-shaped relay pipes 14 are disposed in the cross pin 3. Each relay pipe has one end projected out from the hub 6 of the cross pin 3, while the other end is projected outward from adjacent hub 7. As will be understood from FIG. 1, one end of the relay pipe 14 is projected from the hub 6 of the cross pin is offset by a distance $l_1$ mm leftwardly from the axis $O_1$ of the hub 6. The relay pipe 14 is fixed in the openings 18 formed in the hubs 6 and 7, by means of bushes 17.

A substantially U-shaped connecting pipe 15 is connected through a ball joint 11 to the end of the relay pipe 14 projected from the hub 6. Also, the other end of the connecting pipe 15 is connected to the above-mentioned rocker pipe 13 through a ball joint 11.

From the foregoing description, it will be readily understood that the main pipe 12 fixed to the upper riser pipe 1 is communicated with the relay pipe 14 mounted in the universal joint 9. This relay pipe 14 is connected to a lower main pipe piece 12a fixed to the lower riser pipe piece 2, in a manner explained hereinbelow.

The main pipe piece 12a is fixed to the lower riser pipe piece 2 such that its end is directed leftward as viewed in FIG. 1. More specifically, the lower main pipe piece 12a is fixed to the lower riser pipe piece 2 such that its end is positioned within a plane B containing the axis $O_2$ of the hub 7 of the cross pin and the axis (not shown) of the lower riser pipe piece 2. A rocker pipe 13a is fixed through a swivel joint 10a to the end of the main pipe piece 12a so as to extend in the circumferential direction of the lower riser pipe piece 2. Also, a substantially U-shaped connecting pipe 15a is connected to the end of the rocker pipe 13a through a ball joint 11a. Furthermore, the aforementioned relay pipe 14 is connected to the end of the connecting pipe 15a through a ball joint 11a.

Thus, machining error and assembling error of the rocker pipes 13 and 13a and connecting pipes 15 and 15a, as well as secular changes caused in these pipes during the operation, are absorbed by these ball joints 11 and 11a.

After the assembling of elements stated heretofore, the upper main pipe piece 12 is communicated with the lower main pipe piece 12a through the rocker pipe 13, connecting pipe 15, relay pipe 14, connecting pipe 15a, and the rocker pipe 13a, thus completing a first communication pipe 21. Meanwhile, a second and third communication pipes are arranged along the first communication pipe 21. A fourth, fifth and sixth communication pipes 24, 25 and 26 are formed in the other of the upper and lower riser pipe pieces, in symmetry to the first to third communication pipes 21, 22 and 23.

Hereinafter, an explanation will be made as to the behaviour of the communication pipes in response to the swinging motion of the riser pipe, as well as behaviour of the communication pipes in connection with the wear of the bearings.

Figure 4:
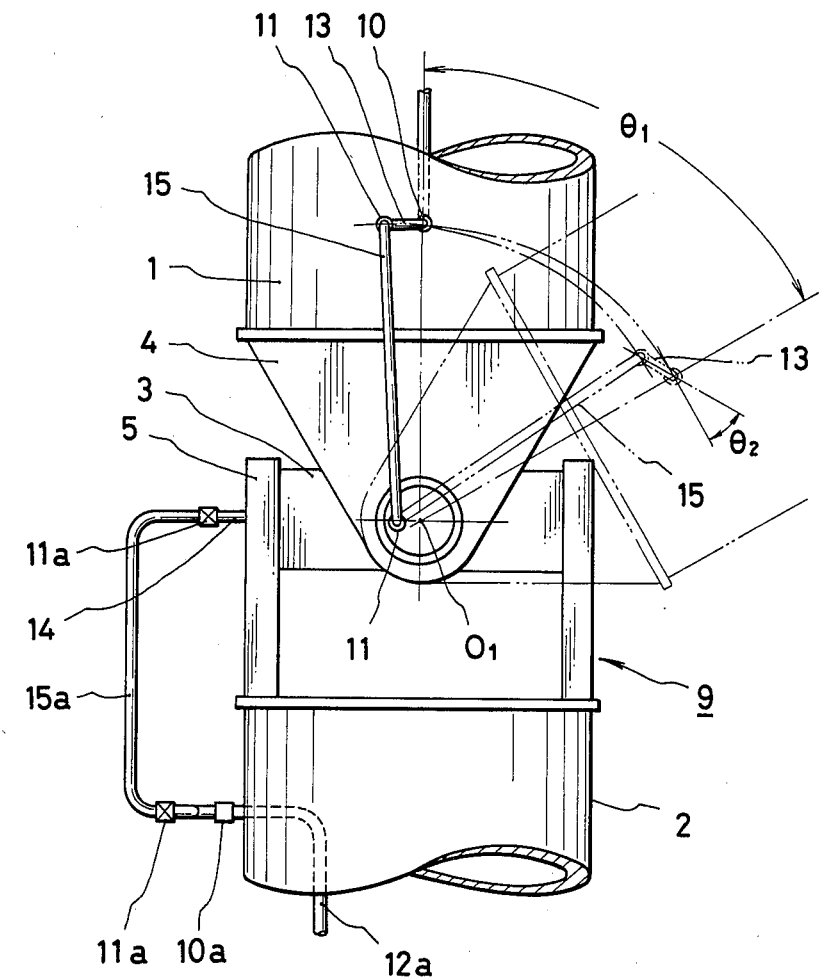
FIGS. 4 and 5 are illustrations explanatory of the behaviour of the pipe.

Referring first to the swinging motion of the riser pipe, as the upper riser pipe piece 1 is inclined to the right by an angle $\theta_1$ in FIG. 4, the rocker pipe 13 is rotated by an angle $\theta_2$ through the swivel joint 10. Consequently, the change of the linear distance between the center of the end of the relay pipe and the center of the end of the main pipe piece, attributable to the offset of the relay pipe 14 from the axis $O_1$ of the cross pin, is absorbed by the rotation of the rocker pipe.

Figure 5:
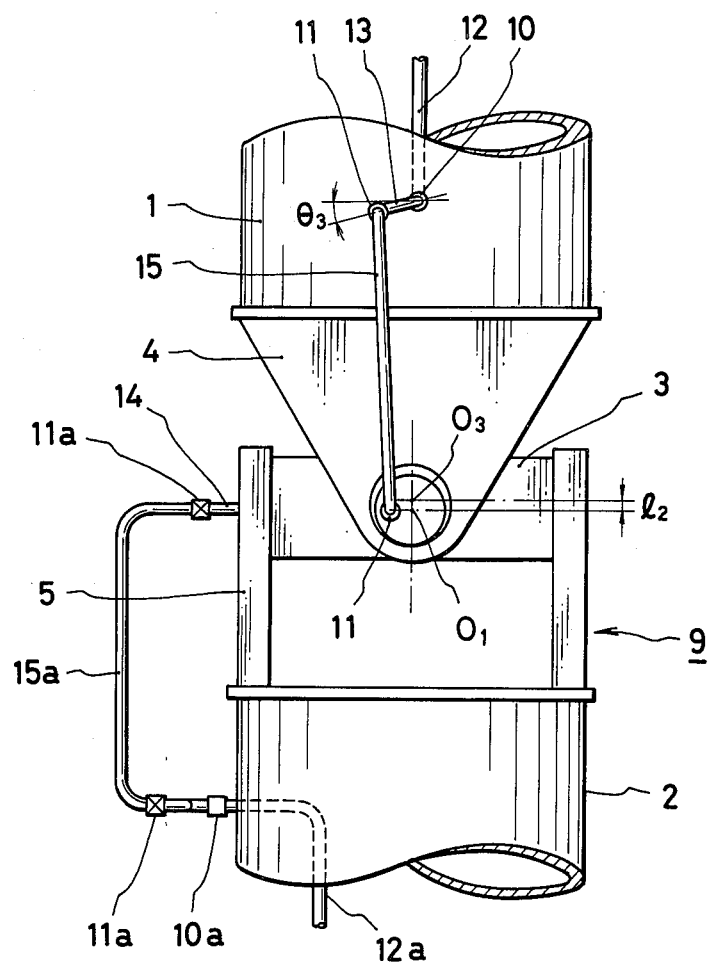

In the event that the bearings have been worn down, e.g. wear down of the bearing 8 during operation, to cause a downward offset of the axis $O_1$ of the cross pin 3 from the axis $O_3$ of the upper yoke 4 by a distance $l_2$ mm as illustrated in FIG. 5, the rocker pipe 13 is rotated by an angle $\theta_2$ to make up for the above-mentioned offset.

As will be understood from the foregoing description, according to the pipe connecting method of the invention, the change of the distance between the end of the relay pipe and the end of the main pipe piece, attributable to the relative swinging motion between the upper riser pipe piece and lower riser pipe piece connected through a universal joint, is completely absorbed by the rotation of the rocker pipes. This means that it is not necessary to obtain the coincidence between the axis of the cross pin and the center of the end of the relay pipe. This not only eliminates the necessity for the precise centering of the relay pipe but also permits a plurality of communication pipes to be arranged in a side-by-side relation in quite an easy manner.

Furthermore, since the parallel arrangement of the communication pipes is facilitated, the amount of lateral extension of the connecting pipe is diminished to save the material of the pipe.

In addition, the adverse affect of the eccentricity between the axis of cross pin and the axis of the yoke, attributable to the wear of the cross pin bearing, is eliminated by the rotation of the rocker pipe, without necessitating the expansion or contraction of the pipe. Consequently, the pipe is protected from its own distortion.

As a result, the lives of the swivel joint and the ball joint are freed from the influence of the wear of the cross pin bearing.

The present invention can effectively be applied to the connection between pipe pieces via a universal joint, when these pipe pieces are fixed to respective members which are connected to each other through the universal joint.

What is claimed is:

1. A method of connecting a first pipe and a second pipe which are within respective first and second adjacent cylindrical members coupled to each other through a universal joint in such a manner as to be able to swing relative to each other, said universal joint including a first pair of opposed yokes attached to one end of said first cylindrical member, a second pair of opposed yokes attached to an end of said second cylindrical member, and a cross pin pivotally mounted in said first and second pairs of yokes, said cross pin having a first hub, a second hub, a third hub, and a fourth hub; said method comprising:

extending said first pipe through a side wall of said first cylindrical member in parallel with said first hub, extending said second pipe through a side wall of said second cylindrical member in parallel with said second hub, extending a relay pipe through said first hub to said second hub, said relay pipe having a first end and a second end which project out of its respective hub, connecting a first substantially S-shaped rocker pipe through a first swivel joint to an end of said first pipe which extends through said side wall of said first cylindrical member, connecting a first substantially U-shaped connecting pipe to said first rocker pipe through a first ball joint and to said first end of said relay pipe through a second ball joint, connecting a second substantially S-shaped rocker pipe through a second swivel joint to an end of said second pipe which extends through said side wall of said second cylindrical member, and connecting a second substantially U-shaped connecting pipe to said second rocker pipe through a third ball joint and to said second end of said relay pipe through a fourth ball joint.

* * * * *